May 30, 1950          G. A. MUSSEN          2,509,607

SPACE HEATING SYSTEM

Filed Nov. 13, 1945          6 Sheets-Sheet 1

INVENTOR
George A. Mussen
BY Reynolds Beach
ATTORNEYS

May 30, 1950     G. A. MUSSEN     2,509,607
SPACE HEATING SYSTEM
Filed Nov. 13, 1945     6 Sheets-Sheet 2

INVENTOR
George A. Mussen
BY
Reynolds Beach
ATTORNEYS

May 30, 1950 G. A. MUSSEN 2,509,607
SPACE HEATING SYSTEM
Filed Nov. 13, 1945 6 Sheets-Sheet 3

INVENTOR
George A. Mussen
BY Reynolds & Beach
ATTORNEYS

May 30, 1950  G. A. MUSSEN  2,509,607
SPACE HEATING SYSTEM
Filed Nov. 13, 1945  6 Sheets-Sheet 5

INVENTOR
George A. Mussen
BY Reynolds Beach
ATTORNEYS

Patented May 30, 1950

2,509,607

UNITED STATES PATENT OFFICE 2,509,607

SPACE HEATING SYSTEM

George A. Mussen, Seattle, Wash.

Application November 13, 1945, Serial No. 628,110

10 Claims. (Cl. 237—8)

Spaces, meaning enclosures, such as a room, a residence, an apartment of several rooms within a building, a public building, an industrial process space, or a similar enclosed space, are heated according to present practice by any one of various means. Such heating means may be a form of circulating air heater, or a series of steam or hot water radiators, or a form of radiant heater, heated by steam, electricity, or hot water, or otherwise.

Each such heating means has its own inherent characteristics, some of which are desirable, and others of which are undesirable. Radiant panel heating means inherently provide an even distribution of heating effect throughout the space, warmth near and on the floor, freedom from draft, and a gradual response to control changes, which renders unnoticeable to the occupants a change in heating rate. It has the further characteristics, undesirable for usual applications, namely: in most common forms it cannot compensate for rapid changes in heating requirements; the rate of air circulation is extremely low; and ventilation means are entirely lacking.

Circulating heated air, on the other hand, has the advantages of quick compensation for temperature changes, and of a feeling of invigorating warmth while mildly heated air is circulated, and of means for ventilation of the space. However, it too has disadvantages. It may produce a feeling not of warmth, but of coolness, unless the circulated air is at a temperature elevated somewhat above that of the space. It lacks the comfort supplied by the presence of heated surfaces within the space. Also, stratification of air in horizontal zones within the space, the coldest air being near the floor, is a condition usually occurring with circulated air heating means.

The characteristic advantages, and disadvantages, of radiator or convector heating means, range somewhere between those of the air heating or panel heating means, according to choice and design of such radiator systems.

So it is with each form of space heater. Each has certain advantages and certain disadvantages, with the result that it has been necessary heretofore to choose that heating system for a space which best suits the usual requirements, and the advantages of which are most desirable for the space to be heated, accepting those disadvantages which that particular chosen system entails. Or, alternatively, some uncoordinated supplementary means have been used, such, for instance, as a ventilation system supplying ventilation and air circulation to a space which is heated by radiators, and the temperature of which space is controlled entirely by the radiator system in a conventional manner. Moreover, systems have been devised wherein the walls or ceilings are held at a fixed temperature and the temperature of the space is controlled by an air heating system. Such combinations differ from the coordinated combinations described hereafter in that, in the combined but uncoordinated arrangements, the disadvantages of each of the space heating means are retained. In the example cited, of radiator heating means, and separate, supplemental ventilation means, for instance, the ventilation means do not contribute to the space heating requirements, but rather introduce new additional heating requirements inasmuch as air from out-of-doors is introduced into the space. Such new heating requirements may, or may not, be compensated for within the ventilation means themselves. Commonly, however, compensation is so provided, in that the ventilation air is tempered to some fixed temperature prior to circulation into the space. However, such prior combined operations in no purposeful way lessen the variations in heating effect required of the principal heating means; or provide for the responsiveness of each combined means to a required change in rate of heat supply; or allow of correction for disturbances in space heating requirements by the particular one of the two heating means combined, as best suits the nature of the disturbance; or allow of supplying heat, as between two or more spaces served, at differently changing rates as best suits the differing characteristics of such spaces; or allow of heat supply, in a radiator heating system, by means proportionately more intensely heating, as between two spaces, as the exposure of the particular space is more severe; or allow of heat supply, as between a radiant heating means and an air heating means, used to heat the same space, by the means best suited to maintain not only a uniform space air temperature but also a uniform space radiant temperature. Other differences between prior heating means and the combined and coordinated heating means described herein will appear as the specification progresses.

According to this invention there is employed not one heating system alone, but two (or more), and moreover, these two systems are so coordinated that full use is made of the advantageous characteristics of each, and the disadvantageous characteristics are largely, if not wholly, cancelled out by the operation of the coordinated system. The coordination between the two systems, so chosen and arranged, is such that conditions affecting comfort within the space tend to remain without fluctuation at an optimum value, with rapidly acting disturbances corrected by rapidly responsive means, with slowly-acting or long-continued disturbances corrected by means of comparably slow and long-continued characteristics. When more than one space is served simultaneously by such a combined system, the coordination may further be so arranged that, although operating under the guidance of a single control means, heat may be most rapidly supplied to those rooms which, by exposure, tend to lose heat most rapidly, while heat is supplied more slowly (or according to planned delay) to those other rooms which inherently are slow to lose heat. Within the limitations of the particular means so combined and coordinated, the coordination may, alternately, be so chosen and arranged as to provide higher radiator temperatures, in rooms of severe exposure, than is provided for rooms of moderate exposure, and in such a fashion as to compensate for such difference between exposures. Or, further, the coordination may be such as to provide more nearly a proportional rate of air circulation and of ventilation as well as a uniform temperature to spaces of differing exposures, than is possible by conventional air heating means responding to single control means.

The attainment of the ends generally expressed above is the primary object of the present invention. More specifically, it is an object to coordinate two differing heating means which are best suited to be so coordinated; to provide simple, efficient, and properly responsive means for so coordinating them; and which when so coordinated, most perfectly meet the desired characteristics, and to the greatest degree eliminate the undesirable characteristics of prior heating systems.

It is also an object of this invention to provide such systems and coordinating means therefor, which in mechanical form will be simple, which in a preferred form can be correctly selected and assembled at the factory, and there adjusted to obtain the characteristics desired, and which can be supplied in package form, to the end that erection is simplified and adjustment on the job by relatively less skilled workmen is minimized or eliminated, at lesser cost and with greater reliability in the installation.

It is also an object to provide such a heating system which is susceptible of control either by a single control element, or by individual control elements for the individual systems, but so coordinated as to be, in effect, under control of a single control device.

Various other objects will appear as this specification progresses, but it is believed that enough has been said to indicate the general objects, and to suggest the manner in which those objects can be attained.

The accompanying drawings are largely diagrammatic, but indicate various illustrative means of coordinating two types of heating systems of different characteristics, to the end in view.

Figure 6:
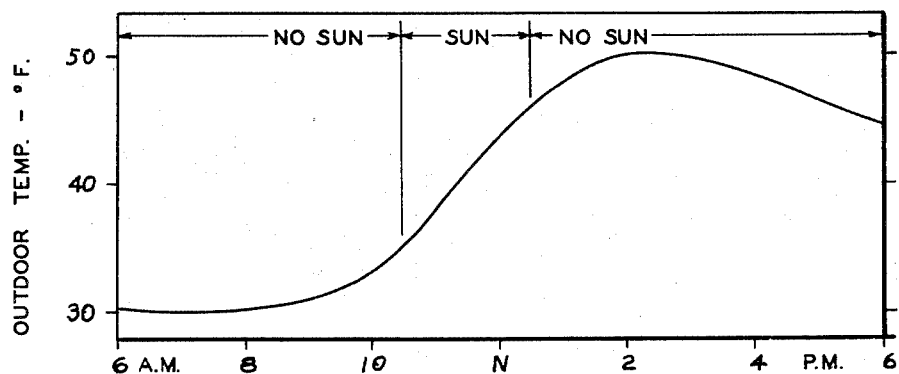
Figure 7:
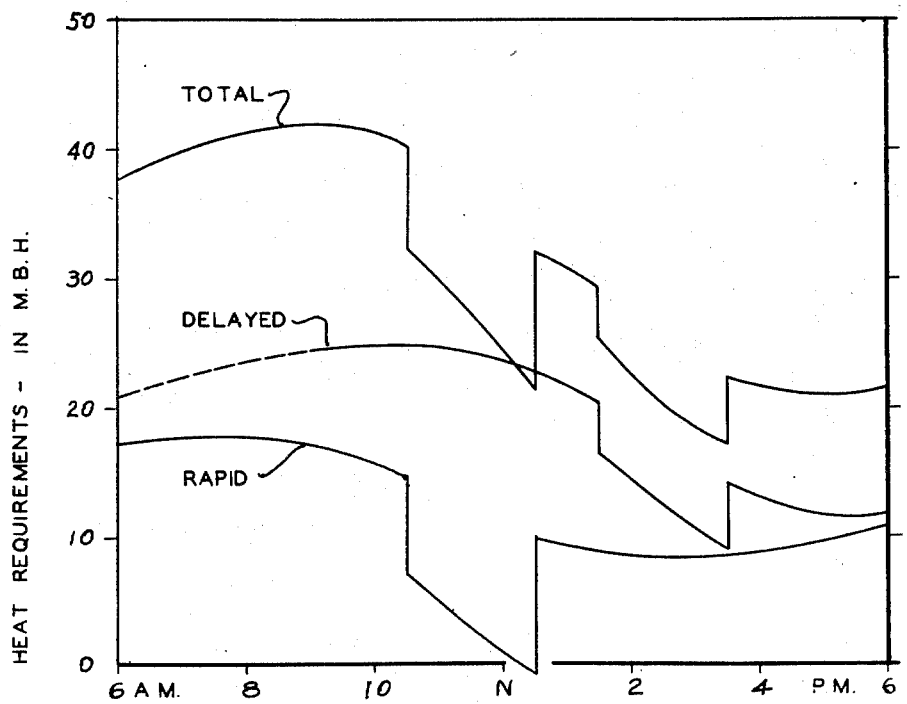

Figure 6 defines, graphically, a series of specific outdoor temperature and solar conditions, which are used as a basis for determining the heating requirements as illustrated in Figure 7, and which are plotted against the time of their occurrence.

Figure 7 shows, graphically, the heating requirements resulting from the conditions, defined by Figure 6, in the space used for specific example throughout this specification. Heating requirements are plotted against time of occurrence, and are shown in three curves, representing requirements rapidly responding to outdoor changes, requirements responding only after a considerable time lag, and the total of both such requirements combined.

Figure 1:
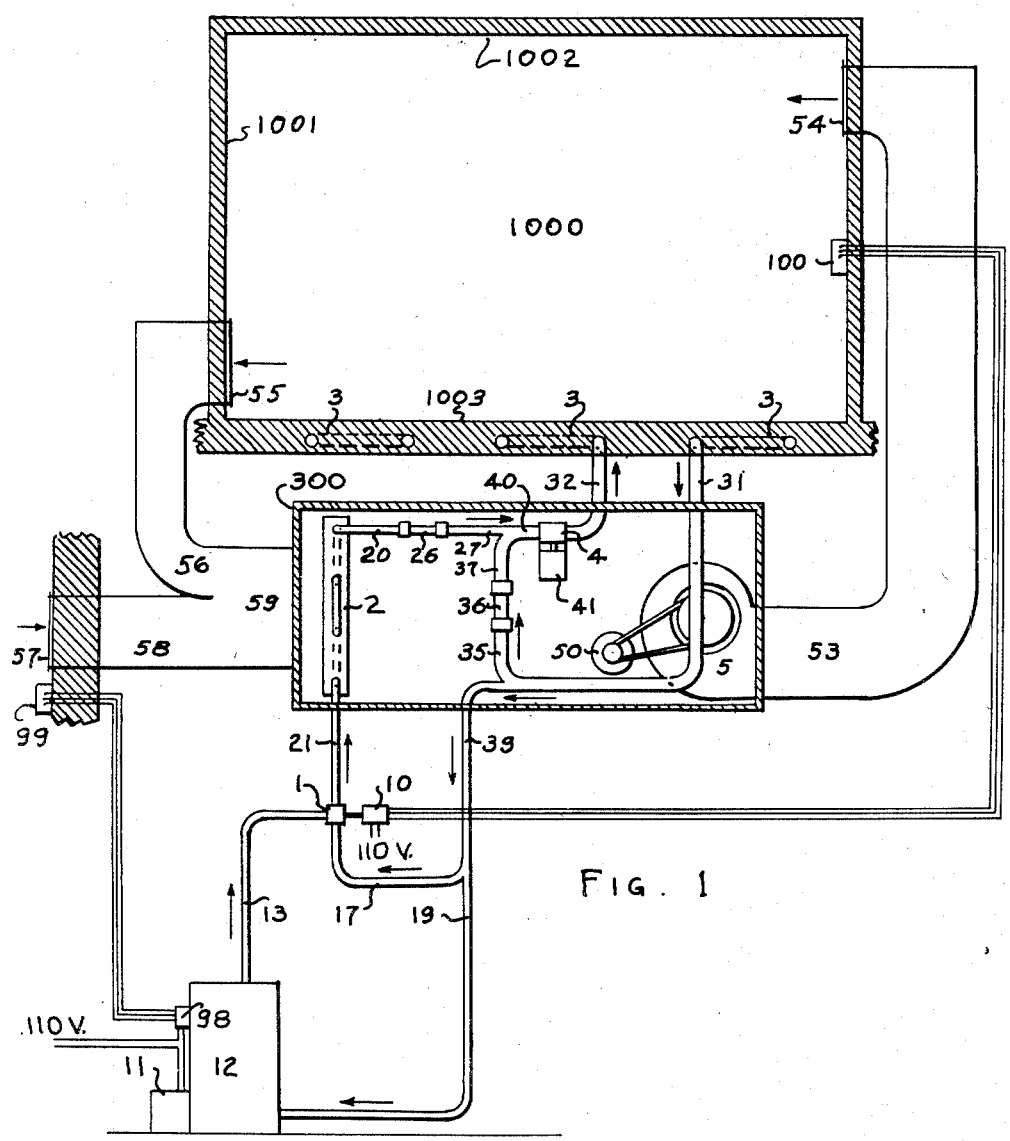
Figure 1 is a diagrammatic view illustrating the combination of radiant panel heating, as the principal source of heat, supplemented by circulated hot air heat, both heating means responding to a single control.
Figure 2:
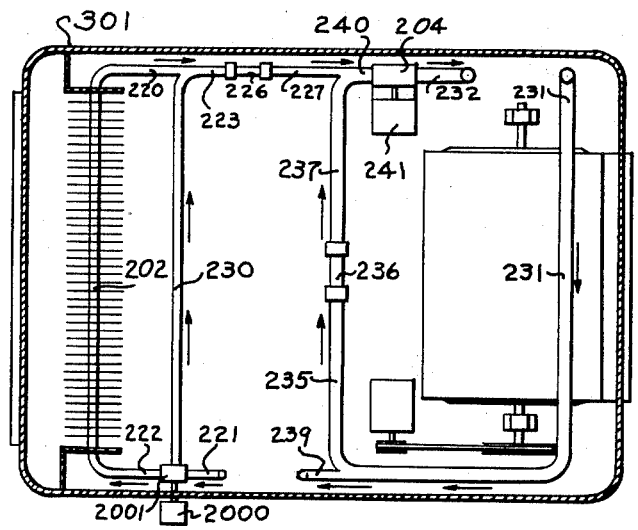
Figure 2 shows, diagrammatically, equipment for a combined system, similar to that shown in Figure 1, but in a modified arrangement, of which only the conditioner unit differs, and in which figure only the conditioner unit is shown.
Figure 5:
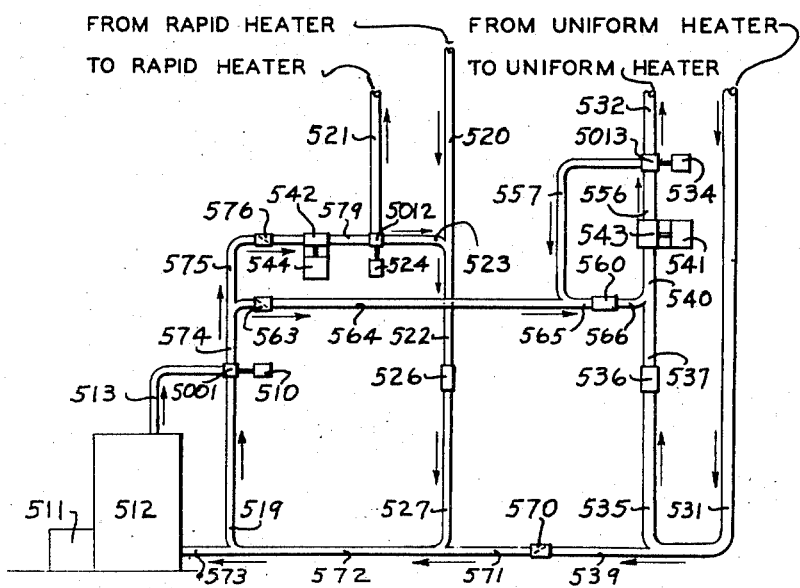
Figure 5 shows the piping connections and water circulation control accessories incorporated in a combined and coordinated system, according to this invention, but using conventional equipment and conventional boiler piping practices, such as separate pumps for each heating means, and accessories available as conventional heating supplies.
Figure 8:
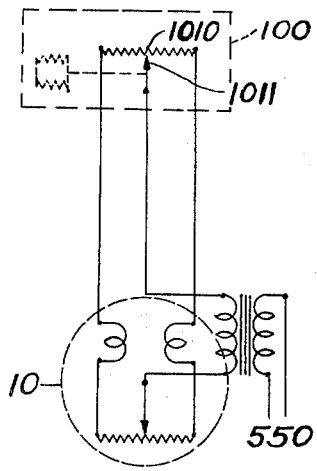
Figure 9:
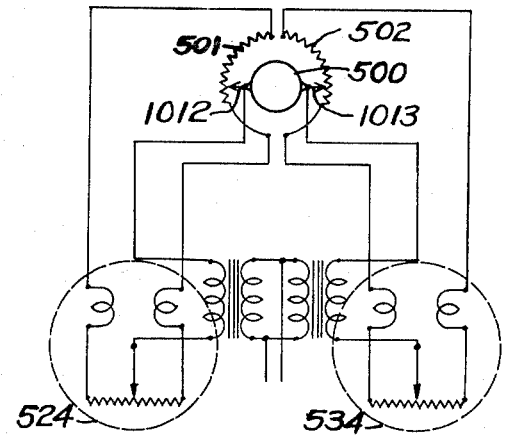
Figure 10:
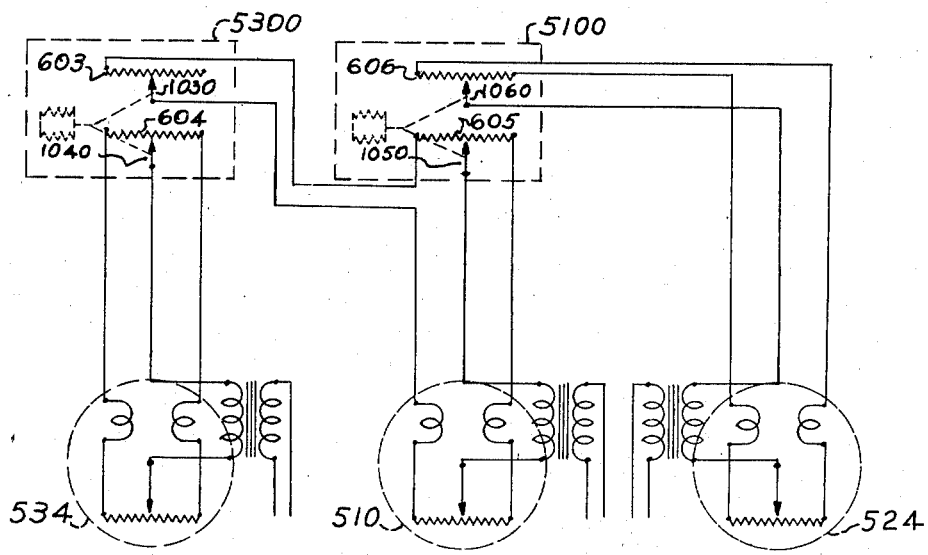

Figures 8, 9, and 10 show conventional control arrangements suitable for use with the various equipment arrangements illustrated in Figures 1, 2, and 5.

Figure 8 is a conventional wiring diagram for a modulating potentiometer type thermostat and corresponding motor, as used for a valve operator.

Figure 9 is a conventional wiring diagram for a manually operated rheostat, which positions two potentiometer type motors.

Figure 10 is a conventional wiring diagram for two double-potentiometer-coil type thermostats, controlling the three motors of Figures 8 and 9, shown in Figure 5.

Figure 11:
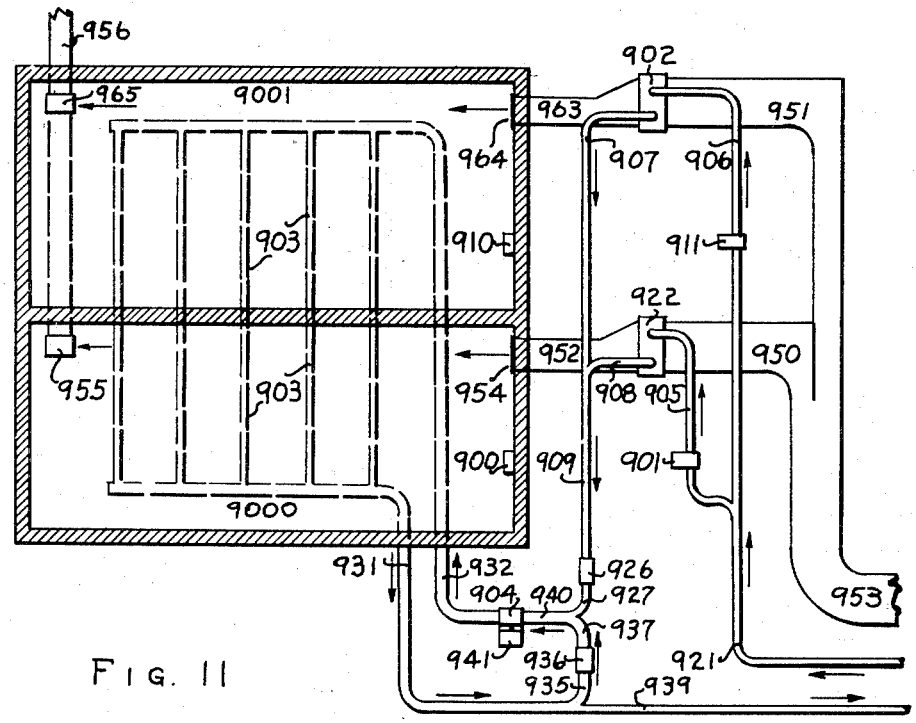

Figure 11 shows an arrangement of combined heating means supplying individual temperature control to each of the spaces heated by the coordinated system.

Figures 12, 13:
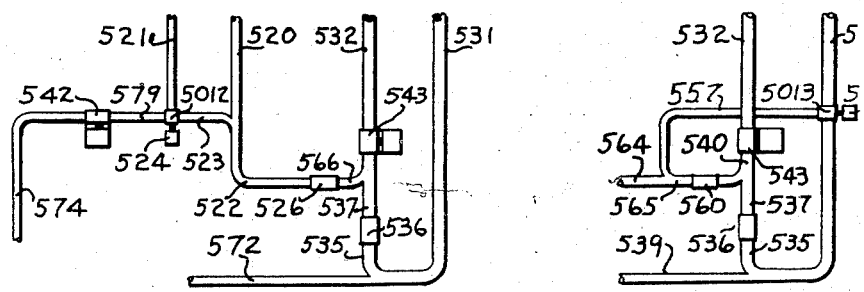

Figure 12 is a fragmentary diagram illustrating a modified arrangement of the piping and fixtures shown in Figure 5.

Figure 13 illustrates a further modification of the piping and fixtures shown in Figure 5.

In referring to the heating of a space, the normal conception is of positive heating, to raise the space temperature by supplying additional heat to the space. In some climates, the removal or subtraction of heat may be equally or predominantly important; in this, heat is absorbed from the space and dissipated. The ideal system will add heat when required, or subtract heat when that is required, and under all conditions will maintain automatically such optimum temperature, within close limits, as is compatible with current general climatic conditions. The systems about to be described, within their design limitations, will supply heat at additive or subtractive rates, to maintain optimum temperature. When supply of heat, or a heat source, is mentioned hereinafter, it is to be understood that this may be additive or subtractive, as conditions require, unless the context plainly indicates a contrary intention.

It will be helpful to consider first the problems involved in choosing or designing a heating system, of whatever type, for a given space.

As is well known to a person skilled in the art, a rapid change in the rate of heat supply to a space is necessary to counteract certain rapidly-manifested results, or influences, of a change of outdoor temperature or solar conditions, such for instance, as results manifested through windows or by infiltration and ventilation air. However, the influences of these same outdoor changes, as manifested through the walls and ceilings, are considerably delayed by a time lag (time consumed by heat transmission through the structural material enclosing the space). This multiple effect on space temperature of outdoor changes has been ignored in the choice and design of prior systems, but is an essential consideration in the elimination of control defects typical with prior systems. Throughout this specification a reference to effect on space temperature of outdoor changes refers to the several effects resulting from such single outdoor change.

For graphical representation of such differing results of outdoor changes as are discussed above, let us consider Figures 6 and 7.

Figure 6 graphically represents changes in outdoor temperature, and solar conditions, over a period of twelve hours, from 6 a. m. to 6 p. m., such as are typical of mild winter weather. The curve shows the variation in temperature, from a minimum of 30° F., occurring at about 6:30 a. m., to a maximum of 50° F., occurring at about 2 p. m. There is one period of sunshine, from 10:30 a. m. to 1:30 p. m., the remainder of the period being cloudy. The conditions represented are, of course, assumed, and are chosen for the purpose of demonstrating the effect of such changes on the heating requirements of a space such as is exampled in the discussion of Figure 1, which heating requirements are similarly represented in Figure 7.

By methods entirely familiar in the art, the heating requirements for a space, such as will be described for Figure 1, and resulting from maintenance of a space temperature of 70°, and outdoor conditions as defined by Figure 6, have been computed and the results are plotted, in Figure 7, over the same period of time represented in Figure 6. That portion of the space heating requirements, which, with little or no lapse of time, follow the variation in outdoor conditions, are shown (in Figure 7) by the curve marked "Rapid." This curve represents the ventilation requirements, the effect of conduction through windows, and the effect of sun shining through windows. In like fashion, that portion of the space heating requirements which are delayed of manifestation within the space, such as conduction through walls and ceiling, whether resulting from outdoor temperature or from sunshine, are shown by the curve marked "Delayed." The total heating requirements resulting from all effects of outdoor conditions (defined by Figure 6) is shown by the curve marked "Total." "Delayed" requirements for the period from 6 a. m. to 9 a. m. are plotted from assumed conditions obtaining prior to 6 a. m.

A time lag of three hours, as would be reasonable for residence type construction, is assumed to be required for conduction through walls and ceiling. For instance, although sunshine commences at 10:30 a. m. (as indicated by Figure 6) and immediately causes a reduction in "Rapid" heating requirements (as shown by the "Rapid" curve of Figure 7), no effect on the "Delayed" heating requirements occurs until 1:30 p. m. No attempt is made to represent the exact, modulated, effect of sudden changes having a delayed effect, the delayed effect of sunshine being represented by an abrupt increase or decrease of delayed requirements. Also, for simplicity, the lag of walls is taken equal to that of roof and ceiling. However, the effects plotted are quantitatively representative of those occurring in typical structures. Other factors affecting space temperature are ignored, since they would add no condition not adequately met with, in effect, in the conditions defined by Figure 6. Furthermore, Figure 7 is based upon the same specific space used throughout the discussion of equipment selection, whether for Figure 1, Figure 2, or for Figure 5, as will appear hereafter.

Such a space may be heated (or cooled) by pipe coils in the concrete floor slab of a building, supplied with a suitably heated circulating fluid medium. Such heating means, known per se, will be invisible, provide an even distribution of heating effect, warm floors, correction for the causes of cold draft, and an inherently delayed and gradual response to control changes which prevents any sharply noticeable change in the rate of heating. Alone, however, such means do not allow of rapid compensation for changed space temperature conditions. For instance, if a door into the space from the outside is left open for an extended period, or even for a short period if the temperature differential is large as between interior and exterior temperatures, the space may cool off rapidly, and only after a rather long time lag will the panel heating means supply sufficient additional heat to restore the desired space temperature. During this time lag, because the slab mass and heat storage capacity is large, there will have been a sufficient oversupply of heat delivered into, stored in, and passing through the heating slab, that the space temperature is likely to continue to increase with the continued supply from such reservoir of stored heat, and hence to overrun the desired temperature. Such overruns may result from sudden changes in solar conditions, fireplace usage, temperature level desired, or even from rapidity of weather variation. Moreover, in panel heating means such as this, there is a feeling of undue stillness in the air, for such a system is characterized by a rate of air circulation considerably below the accepted optimum range of air circulation rates. Moreover, such a system in no way provides for ventilation, and ventilation is considered repugnant thereto, in that ventilation connotes temperature change which is not governable by the controls for the panel heating means.

While an air heating system, employing circulated heated air, may respond quickly to sudden changes such as are considered above, if the temperature of the circulated air is only slightly above space temperature, a sensation of coolness, rather than of warmth, may result from the cooling effect produced by the motion of the air itself. The circulated air heating system, however, if so designed, affords the means for ventilation, and for adding fresh air to replace vitiated air, and for accomplishing this in a manner contributory to the desired heating operation. As well as its advantages, however, the air heating system has its recognized and characteristic disadvantages. For optimum operation when used alone, spaces and locations for ducts and outlets are of great importance, and frequently are not available as required. The air, regardless of its circulation at any tolerable rate, tends to stratify, and the hot air rises to the ceiling of the space, whereas the floor and the strata adjacent the floor will be cool. Also, an air heated space has a characteristic of feeling too cool during periods of low heating rate.

And so with the other heating systems which might be used, there are advantages and disadvantages such as are well known to one skilled in the art. No one system has been found ideal.

According to the present invention, a uniform heater, such as is typified by, but not confined exclusively to, panel heating, is employed in conjunction with a rapid heater, such as, but not confined exclusively to, a circulating air heater. But the employment of two individual and separate heaters is not enough. They must be so coordinated in their operation, and in their response to change in temperature or heating requirements, that only such changes are made by either of the uniform or the rapid heaters, as will satisfy the changed requirements, to the end that there is maintained an optimum temperature, regardless of whether any change or disturbing factor is gradual and long continued, or transitory, or whether such change calls for increase or decrease in room heat supply; all this of course, within the capacity and design limitations of the combined and coordinated heating means chosen. How that is done will be illustrated in the specific descriptions of the various typical coordinated systems, which follow.

It is an object to provide combined heating means coordinated according to this invention, that is to so choose and arrange space temperature controls that they will respond rapidly to a change in outdoor temperature, and to so choose or design the rapid heater that it will respond approximately equally but oppositely to rapidly acting influences on space temperature, and to so choose or design the uniform heater that it will respond equally, and substantially contemporaneously, but oppositely, to delayed influences on space temperature. In an ideally perfect application, then, such a uniform heater, so arranged, would prevent any effect whatsoever upon space temperature by such delayed influences. In practical operation, however, it is probable that space temperature control means will have to correct, by adjustment of the rapid heater, departures by the uniform heater from such ideal operation, and correct also for undue response by the uniform heater to space temperature affecting factors originating within the space, such as, for instance, a fire in a fireplace, a change in thermostat setting, or occupancy, or the like.

It is to be noted here, however, that such proportioning of the rapid heat to the uniform heat, to exactly compensate differing influences of the same outdoor change, in the manner just described, is not the only desirable method of proportioning relative rapid and uniform heater capacities. For example, it may be desired to proportion the capacity of heating means from considerations such as: deficiency of spaces available to radiators, or air outlets, or panel surfaces; or deficiencies of circulation, or ventilation, in an otherwise preferable heating means.

In the arrangement shown in Figure 1, radiant panel heat is supplied as the main source of heat, to the end of establishing a uniform, draft-free, heating operation. It is supplemented by circulating air heating means, which allow of ventilation, circulation, and, particularly, of a quick response on the part of the combined heating means to a change in the required rate of heat supply. For convenience, the more slowly responding heating means, which is the radiant panel heating means in this instance, will be referred to as the panel heater or as the uniform heater. The air heating means, or, in general, the rapidly responding heating means, will be referred to as the air heater, or as the rapid heater. Both the rapid heater and the uniform heater are preferably supplied their heat from a common prime source (though this latter is not essential), such as a hot water furnace, by water circulation piping connecting the furnace with the rapid and uniform heaters, directly or indirectly, and including proportioning means.

In Figure 1, a room (or rooms) 1000, constituting the space to be heated, is defined by walls 1001, ceiling 1002, and floor 1003. It is supplied with a certain portion of its heat requirements by air passed over an extended surface heat transfer means 2, located within casing 300, which heated air is introduced into room 1000 through register 54. A portion of the room air is recirculated through grille 55 and duct 56, and as a refinement, may be continuously admixed with fresh air drawn from out-of-doors through grille 57 and duct 58. Both fresh and recirculated air are carried back to heat transfer means 2 through duct 59, being so moved by a fan 5 driven by a motor 50 (both being within casing 300) which fan discharges mixed fresh and recirculated air directly into duct 53 and thence to register 54. For cooling, the heat transfer means 2 may receive infrigidation from a suitable source, of which many are known, for transfer to the circulating air.

Also illustrated in Figure 1 is a panel heater for the room 1000, consisting of coils 3 buried in the floor 1003 of the room, which floor in this case is presumed to be of concrete. Heated water (or in summer, cooled water) is supplied to coils 3 from within the casing 300 through pipe 32, and thence is returned through pipe 31. Circulation of water is effected by pump 4 driven by motor 41, also within the casing 300, and such circulation is continuous throughout the heating season in the case illustrated. Since the rapid heater, though of small heat storage capacity relative to the uniform heater, requires a higher temperature of water than is permissible in radiant heater coils 3, the pipe 35, 37 is so arranged as to divert a part of the cool water being returned through pipe 31 from coils 3, for admixture in pipe 40 with hotter water leaving the air heating means 2 through pipe 20, 27. The proper flow and ratio of flow of cool to hot water volumes so admixed is maintained by means such as resistances 36 and 26, which per se will be described shortly and which are shown in detail in Figure 4. All such piping, in the preferred physical embodiment, is within the casing 300, which thus contains substantially all elements of the combined system other than those necessarily in the room, or associated with the prime heat source. Such a "package," factory-adjusted and ready for a particular installation, may be supplied and installed as a coordinated unit.

The remaining water circulation path, illustrated in Figure 1, is that controlled by a conventional three-way mixing valve 1. Water, in the water-heating boiler 12, is maintained at a temperature of, for instance, 162° F. to 172° F. by a conventional electric heater, or oil, gas, or coal burner 11, under control of a conventional water temperature control aquastat 98. Relatively cool water, such as is not recirculated via pipe 35, 37, is being returned toward boiler 12 through pipe 39. However, pipe 17 is so arranged as to divert a part, or all, or none, of the water circulated through the pipe 39, according to the position of valve 1. Water not so diverted from pipe 39 continues to boiler 12 through pipe 19, and heated water in equal quantity leaves the boiler 12 through pipe 13 and enters the mixing valve 1. The tempered water, leaving mixing valve 1, is led through pipe 21 to air heater 2.

Mixing valve 1 is operated by a reversible motor 10 under control of thermostat 100, which responds to air temperature in space 1000, or to some factor which affects such space temperature. Such a mixing valve with its by-pass pipe, motor and control are conventional and familiar to the art, but for completeness are futher illustrated in connection with Figure 8, which figure will also serve as a legend for conventions employed in Figures 9 and 10.

Figure 8 shows the potentiometer coil 1010 and wiper 1011 as included in thermostat 100 of Figure 1. No attempt has been made to correctly position wipers, or to graphically represent coil resistances. The wiring connections, to the balancing relay and the balancing potentiometer and wiper, as included in the housing of motor 10 of Figure 1, are also shown as are the transformer connections at 550. As this is one of the simplest applications of modulating control, no detailed explanation is deemed necessary. Figure 8 illustrates one type of control system for the equipment illustrated in Figure 1, in that thermostat 100 responds to air temperature in space 1000, and positions mixing valve 1, by means of motor 10, as required for maintenance of uniform space air temperature.

The above outlined control system applies for the following discussion; however, thermostat 100 may, if desired, control the burner 11, and mixing valve 1 and by-pass pipe 17 be omitted, in a manner entirely familiar to the art. Or, alternatively, burner 11 may be controlled by outdoor thermostat 99 and aquastat 98, in which case it is considered necessary to retain mixing valve 1 and thermostat 100, or some counterpart thereof.

In discussing operation of the system illustrated in Figure 1, the application exampled will be adhered to for all precise examples throughout this specification. Round numbers will be used instead of fractions or decimals not adding to the clarity of the discussion. Similarly, results only will be used where the conditions and computations necessary to produce them are familiar to one skilled in the art, and small errors, in the interest of simplification, are tolerated without comment.

In this example, the heat to be supplied to room 1000 under maximum or "design" conditions, is to be 63,000 British thermal units per hour (B. t. u./hr.), for maintenance of 70° F. indoors with plus 10° F. outdoor temperature. From consideration of factors above discussed, and other factors well known in the art, it is desired to supply 27,000 B. t. u./hr. by rapid heater 2, and 36,000 B. t. u./hr. by the uniform heater 3. The total air circulation is to be 500 cubic feet per minute (c. f. m.) of which 216 c. f. m. is to be fresh air, and 284 c. f. m. is to be recirculated air. The maximum allowable floor panel surface temperature is to be 84° F. Design of the uniform heater coils 3 is such as to require, at 36,000 B. t. u./hr. output, a circulation of 9 gallons per minute (g. p. m.) of water entering through pipe 32 at a temperature of 105° F. Allowing 20% for downward heat loss, water accordingly leaves coils 3 through pipe 31, at 95° F. Let us assume that a boiler water temperature of 167° is to be maintained for whatever reason. Water returning to boiler 12 via pipes 31, 39, and 19 is at a temperature of 95° F., and if water leaving through pipe 13 is at 167° F., the flow required to carry 72,000 B. t./hr. is 2 g. p. m. If 2 g. p. m. are returned to boiler 12 via pipe 39, then 7 g. p. m. (of the 9 g. p. m. from pipe 31) are diverted through pipe 35, 37, and at a temperature of 95° F. Since 9 g. p. m. are required at a temperature of 105° F., the 2 g. p. m. leaving coil 2 via pipe 20, 27 must be at a temperature of 140° F. Air heater coil 2, then, is selected to have the required 27,000 B. t. u./hr. output with 2 g. p. m. of water entering, via pipe 21, at 167° F. and leaving, via pipe 20, at a temperature of 140° F.

It is assumed, for purposes of the several examples, that modulating or proportioning valves, such as mixing valve 1, modulate uniformly on a 3° F. rise in space temperature at thermostat 100, from a position allowing passage of 100% of heated water (or from pipe 13 only), to a position allowing passage of 100% of recirculated water (or from pipe 17 only). Let us consider the operation of the above combined system during an hypothetical extended period of unvarying outdoor design temperature of 10° F. During such an extended period, the rapid and uniform heaters come to an unchanging balance of operation at maximum capacity.

Now, if into this balanced operation a disturbing factor is introduced, such as a rise in outdoor temperature, sooner or later this will be reflected in a rise in temperature of the space 1000. Thermostat 100 will act to reduce the temperature of water leaving the mixing valve 1 through pipe 21, for now less heat is required to maintain room temperature. If the rise in space temperature reached ¾° F. at the new balance between space temperature and space heating requirements, water leaving the mixing valve would drop from 167° F. to 149° F. (one-fourth recirculated water at 95° F. and three fourths heated water at 167° F.), and air heater capacity would rapidly drop nearly proportionately, to some 21,000 instead of 27,000 B. t. u./hr. For simplicity of example, let us assume the elevated outdoor temperature persists, without additional change, for a period sufficiently long to allow of reestablishment of balanced operation as between the air heater and the panel heater. Under these conditions, water entering the panel heater through pipe 32, immediately after change in rapid heater output, is seven-ninths recirculated water at 95° F. and two-ninths water from pipe 27 at 128° F. If coils 3 contain a representative 45 gallons of water, 5 minutes will elapse before any change in recirculated water temperature occurs, and several such changes of the contents of the coils 3 will be required before water enters coils 3 through pipe 32 at a fully reduced temperature. This lag in response to a change of temperature of water supplied from pipe 27 is, however, only part of the lag in response of the uniform heater to control changes. The heat storage capacity of, and the time required for heat conduction through the concrete directly over the pipes of coils 3, must both be satisfied before any change of (uniform heater) heating rate becomes apparent in the room 1000. Further, the same retarding effects of the larger mass of concrete between the pipes of coils 3 must be satisfied before such change of (uniform heater) heating rate becomes fully manifested in room 1000. However, for purposes of an ideal example, it may be assumed that this entire time lag on the part of the uniform heater is comparable to the lag in the effect of outdoor changes manifested in room 1000 through the exterior walls or roof of the room (see Figure 7), which is similarly delayed from like causes (namely, heat storage capacity of the walls or roof, and the time lag in heat conduction through such walls and roof). Then, with thermostat 100 chosen and arranged to respond to a rapid change in room heating requirements, such as result from a change in heat transmission through windows, and with the rapid heater chosen and arranged to counteract the effect of outdoor changes through windows only, it will be seen that, in the example above, no further adjustment or readjustment is required. This is true because the delayed lessening of heat transmission (through walls and roof) coincides with, and is counteracted by, a similar delayed lessening of heat supply by the uniform heater, by reason of choice and design of the uniform heater. Values, involving both heat storage capacity and lag due to heat transmission, are approximate, in the lack of complete and reliable empirical data.

We have, then, outlined above, a rapid heater and a uniform heater operating originally at maximum capacity and at balanced relative operating capacity, and maintaining a stable space temperature. By a rise in outdoor temperature, space heating requirements then become reduced; firstly, by reason of reduction of heat transmission through windows, and secondly by reason of simultaneously initiated reduction in heat transmission through walls and roof, which is, however, delayed as to effect within the space by a period of 2 to 4 hours. Space temperature control 100 is so located as to respond to the effects of the first reduction in heating requirements, and reduces the temperature of water supplied to the combined heaters. Within some 2 to 5 minutes, the rapid heater output reduces proportionately to the reduction of such water temperature, and thereby prevents further space temperature disturbance. However, the reduction of water temperature also causes a proportional reduction in the uniform water output, which is delayed, as to effect within the space, by a period of about 1 to 5 hours (principally effective, however, after a delay of 2 to 4 hours), and thereby corrects the comparable delayed, or second, reduction in space heating requirements. This second correction, in the ideal example, is effected with little or no change in space temperature.

Let us consider Figure 7 together with the equipment selected, as discussed above, for Figure 1. Ideally selected, it will be obvious that the rapid heater 2 of Figure 1 will respond, both as regards the time of and the rate of heat supply, approximately as is required by the "Rapid" requirements shown in Figure 7. Similarly, the uniform heater 3 of Figure 1 will respond approximately as is required by the "Delayed" requirements of Figure 7, not only as regards the rate of heat supply, but also as regards the time at which any particular rate is manifested. The uniform heater may be selected or designed to have a delay commensurate with the delay of predominantly delayed heating loads, inherently, or it may be a conventional direct heater given the appropriate delay by supplying it with heated fluid circulated through artificial delaying means, such as a tank. The combined heating means, as illustrated in Figure 1, will, then, respond both as to time of, and as to rate of heat supply, approximately as required for the maintenance of a uniform space temperature, which requirements are shown by the "Total" curve of Figure 7. A change of thermostat setting, or of fireplace usage, however, originate within room 1000. Changes in heating requirements from such causes are rapidly corrected by the air heater, which may quickly vary from near minimum to near maximum heating rate, should extremes of such requirement changes so demand. Such corrective changes, however, are completed during short periods, and then the rapid heater resumes a stable heat output rate. In the intervening period the heat output rate of the uniform heater has changed but negligibly. Such sudden changes in air heater operation will not be objectionable in effect upon room occupants, therefore, as such extreme change is limited to one source of heat only; and because the rate of heat supply by the panel heater will change negligibly over any short period, the latter will exert a stabilizing influence on room comfort conditions. However, all changes in the rate of heat supply by the air heater will be followed by a retarded, cumulative change in the rate of heat supply by the panel heater, which then, will operate at a rate proportional to the average of the necessary corrective rates of air heater operation, and at the designed proportion of the total heat supply. Secondary correction by the air heater output, as required to correct the initiated but unrequired change in uniform heater output will be, for practical purposes, a final correction due to the leveling effect of each factor retarding uniform heater response, and due to the effect of new changes in space heating requirements, if any.

The factors influencing selection of rapid heater capacity will normally insure adequate provision for an allowable minimum temperature of air being introduced into space 1000 through register 54. For instance, the lowest temperature of air entering unit 300 will be 44° F. (216 c. f. m. at 10° F.+284 c. f. m. at 70° F. produce 500 c. f. m. at 44° F.). However, even 100% recirculation water, from pipe 39 entering coil 2 through pipe 21 would be at or near 95° F. for operation during such severe outdoor conditions. Water at 95° F. will produce air, at register 54, at a temperature of 67° F., which being a rare extreme low, should be allowable. If desired, however, conventional low limit controls may be added, in a manner familiar to the art.

Differently stated, a change in the space heat requirements will initially cause a compensating change in the heat supplied by the rapid heater, and at the same time will initiate a corresponding change in the uniform heater. As the change in heat requirements persists, the uniform heater's output will change compensably, and as it changes the initially changed output of the rapid heater will, relatively, change back, until, at stabilization at the new output rate, the balance between the rapid and uniform heaters will be restored, at the new output rate for each. In the interim the space temperature will have been maintained substantially constant, and the rapid heater will have supplied (of course, within design limitations) at all times such portion of the space's heat requirements (positive or negative) as the uniform heater, at its instantaneous rate of heat supply, was unable to supply.

Figure 3:
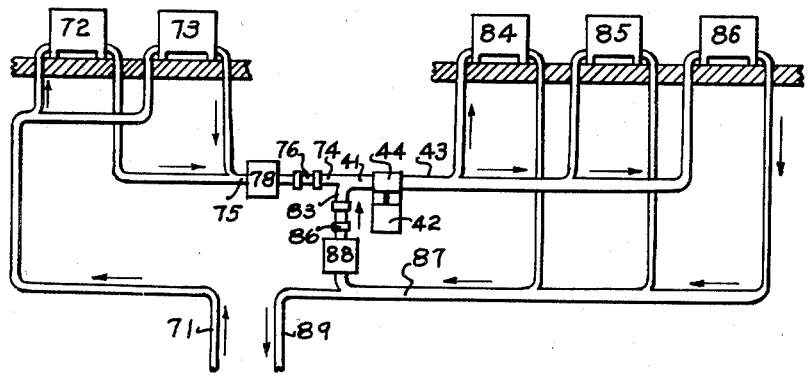
Figure 3 illustrates two radiator heating systems, used in coordinated combination, arranged to heat the same space or spaces.

The combination, illustrated in Figure 1, retains advantages inherent in either means alone, namely: advantages of the air heater, rapidity of response, ventilation, and circulation; and advantages of the panel heater, uniform distribution, freedom from draft, warm floors, and maintenance of a stabilizing sensation of persisting warmth. The results obtained by the combination are characteristics of the separate means utilized, and may be similarly realized whether heat is supplied to either heater by hot water, or steam, or by heated air, or electricity, so long as the rate and duration of each supply is similarly proportioned by any of the conventional control means familiar to the art. Further, the choice of heating means to be used in combination is limited only by the result desired, and any two of the conventional heating means familiar to the art may be used in combination. For instance, and as will appear in detail shortly, Figure 3 shows two radiator systems used in combination. Other heating means which might be used in combination are; electric induction heaters, electrically heated tapestries or panels, various types of electric lamps, various types of space heaters, prefabricated radiant panel heaters, volume heaters, or unit heaters, or the like.

In addition to illustrating a typical combination of a rapid and a uniform heater in a comparatively simple system, Figure 1 also illustrates the usage of three equipment or mechanical improvements: first, a piping arrangement permitting the use of a single pump 4 to supply forced water circulation to each of the two combined heating means 2 and 3, and offering advantages over the use of a separate pump for each heating means; second, the use of precalibrated, fixed, water flow resistances 26 and 36, which can be so chosen as to produce specified water circulation rates throughout a specified combined heating system; and third, the embodiment within a unitary assembly (which assembly can be calibrated as a unit having predetermined water circulation rates for any specified application) of a single pump 4, resistances 26 and 36, and by-pass piping 35 and 37. Figures 2 and 5 illustrate additional by-pass and accessories advantageously embodied within such an assembly, whether incorporating a single pump, or two separate pumps, equivalent to the arrangement illustrated in Figure 5.

While it would be incorrect to describe the arrangement of Figure 1 as a preferred form or embodiment of the invention, for the reason that there can be no single form that will best suit all conditions and requirements, nevertheless, the form of Figure 1 is an advantageous form. However, the invention can be embodied in an arrangement which exhibits somewhat less of mechanical coordination, but which requires no factory assembly of equipment combinations, and which can be built and installed by artisans on the job from standard piping and fixtures. Figure 5 illustrates such an arrangement.

In that figure, the circulations for the rapid heater and for the uniform heater are largely segregated and separated, and individual pumps are used to effect the separate circulations. Thus, pump 542, driven by motor 544, circulates hot water to the rapid heater through pipe 521, and cooled water from the rapid heater returns through pipe 520, 522, 527, 572, 573 to boiler 512. Water is supplied to the uniform heater under the influence of pump 543, driven by motor 541, by way of pipe 556, 532, and is returned to the boiler through pipe 531, 539, 571, 572, 573. Mixing valve 5001 and pipe 519 are arranged to divert water, returning to the boiler 512 through pipe 572, according to position of valve 5001, operated by motor 510. Water so diverted is mixed with water leaving the boiler 512 through pipe 513, part being lead to the rapid heater pump 542 by pipe 574, 575, and the remainder being conducted to uniform heater pump 543 by pipes 564, 565, 566, and 540. As in Figure 1, Figure 5 provides for recirculation of water, diverted from pipe 531 through pipes 535, 537, and 540. This water is mixed with water from pipe 566 and delivered to the uniform heater through pipe 532, as above. Flow regulating means 526, 536 and 560 are so arranged as to enable control of rates of circulation in the water circuits enumerated above. Check valves 576, 563, and 570 are incorporated to prevent undesired circulations of water. Pumps 542, 543 operate continuously throughout the heating season, for purposes of this example.

Ignoring proportioning valves 5012 and 5013, and bypass pipes 523 and 557, for the moment, a person skilled in the art will see that the equipment arranged as in Figure 5, and supplying a rapid heating means and a uniform heating means similar to those described in Figure 1, will provide an operation similar to that provided by and discussed in Figure 1.

The arrangement shown in Figure 1, however, has many advantages. One such advantage, resulting from the use of a single pump, is the elimination of the major part of the pipe fitting required on the job, for it is considered preferable to eliminate as much such fitting on the job as is possible for a given installation, for reasons of cost, uniformity, dependability, appearance, avoidance of unskilled installation and adjustment, simplicity, and the like. Another advantage of the form of Figure 1 is the elimination of one pump and its electrical wiring connections, with their costs and complications in installation and operation. Still another advantage of the use of a single pump, in the Figure 1 (and Figure 2) form of the invention, is that the coordination between the rapid heater and the uniform heater is greatly simplified, in that all water circulated through the rapid heater, in the Figure 1 (and Figure 2) form, must pass through the uniform heater, and thereby exert its full-proportionate, variation of heating effect in each heater. With the arrangement illustrated by Figure 5, such desired, proportionate, variation of heating effect, as between the rapid and uniform heaters, depends on the precise, separate, regulation of water flow rates through each heater, as well as through diversion or by-pass pipes 535, 537. These advantages, taken together, lower the cost, improve the appearance, and simplify the installation of coordinated heating means, and render the "package" form of Figure 1 preferable to the "on-the-job" construction of Figure 5.

A rearrangement of the piping and fixtures of Figure 5, as illustrated in Figure 12, will allow of the exact duplication, by conventional fixtures, of the operation accomplished by the equipment illustrated in Figure 1. This duplication is accomplished, however, at the expense of unconventional complication of piping, and at considerably greater complication of the initial balancing and adjustment of the system. In Figure 12, water leaving the rapid heater through pipe 522 is the only source of heated water available to the uniform heater, as compared with Figure 5 in which each heater is separably supplied from the prime source 512. For exact duplication of Figure 1 operation, valve 5012 and by-pass pipe 523 of the Figure 12 arrangement, are inoperative and pump 542 is not required.

It is the object of the arrangement shown in Figure 5, when valves 5012 and 5013, and by-pass pipes 523 and 557, are inoperative, to provide means for the coordination of two separate heating means, of a selection and nature as described in the discussion of Figure 1, without, however, the advantages accruing to the use of a single pump, but with the advantage of being assembled from parts commonly available. The arrangement shown in Figure 5 may be made simpler of installation and adjustment through use of assemblies of calibrated parts, such as are described hereinafter.

Figure 5 also illustrates a conventional proportioning valve 5012, controlled by a reversible motor 524, and allowing of diversion of water from pipe 579 through pipe 523 and into pipe 522, thus diverting water around the rapid heater altogether. The object of this provision for by-passing the rapid heater will become clear in the discussion of Figure 2, and (with the omission, for the moment, of valve 5013 and by-pass pipe 557), such provision in Figure 5 allows of the same advantageous operation which the arrangement of Figure 2 has as compared to the arrangement of Figure 1, which are pointed out in the discussion of Figure 2.

Figure 5 also illustrates the usage of a conventional proportioning valve 5013, operated by reversible motor 534, and which provides for recirculation of water through pipe 557, from pipe 556, into pipe 565, thereby not only by-passing the uniform heater with the amount of water so diverted, but also regulating the admission of heated water from pipe 564 into the uniform heater circulation. If constant flow rate through the uniform heater is desirable, such valve 5013 may be installed in pipe 531, as illustrated in Figure 13, which shows only the rearrangement required for such constant rate of water flow through the uniform heater. The object of Figure 5, complete in all fixtures as illustrated, and when used with a rapid heater and a radiant heating means as described for Figure 2, is to provide means for maximum variation of the coordination between such combined heating means. Such variation may be of such a nature that space air temperature is maintained by the particular means most conducive to maintenance of a uniform space air temperature at a uniform space radiant temperature; such simultaneous maintenance of air temperature and radiant temperature being, of course, within the limitations of the equipments chosen, and of the inherent characteristics of the space so served. Such variation of coordination, involving operations not discussed up to this point, is described shortly in the discussion of control arrangements, as shown by Figure 10.

As will by now be evident, regulation of relative and quantitative water flow is of importance to successful operation of any combined system specifically discussed above. Only by proper adjustment and selection of resistance means, such, for example, as 26 and 36 of Figure 1, is it possible to insure that the quantity of flow conforms to the requirements, and that, for instance, seven-ninths (or any selected portion) of the water returned from a uniform heater will be recirculated therethrough, and two-ninths (or some other portion) returned to a boiler for reheating and for circulation, as in Figure 1, through a rapid heater. As Figure 5 illustrates, a particular proportioning, as between two heating means, when two separate pumps of fixed or predetermined capacity are used, practically requires regulatory or resistance means 526, 536, and 560, which must have the relation, as between each other, not only to proportion such recirculation rate, but to correct for inherently different or proportionately unrelated characteristics of the two pumps used. It would be desirable to supply such regulatory or resistance means having exactly the required values, and requiring no adjustments. However, even though the resistance value of the resistance means itself be available as required, by selection, the exact nature and characteristics of pumps, check valves, and piping, all as illustrated in Figure 5, would usually be available only by individual (and impractical) test. On the other hand, the arrangement illustrated in Figure 1 allows usage of equipment and fixtures of known characteristics, which may be used in calibrated combinations, and which, therefore, allow of computation of the supplementary resistance means necessary to produce a specified water circulation, or circulations. Accordingly, resistance means such as 26 and 36 of Figure 1, may be factory selected and installed, in an arrangement also as illustrated in Figure 1, to produce, with little or no adjustment, a specified rate of water circulation (and recirculation), when used in conjunction with any fully specified uniform heater and source of heat.

Figure 4:
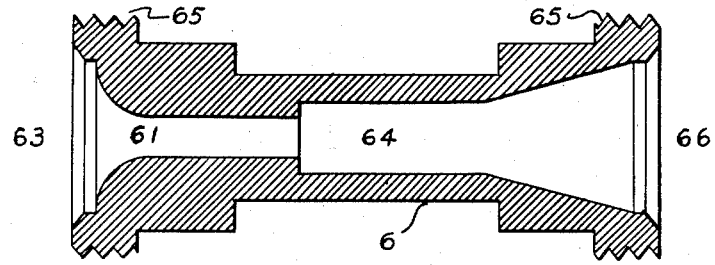
Figure 4 shows an axial section through a conventional, fixed, resistance means of a type suitable and preferable for regulating the rate of water circulation in the various systems discussed herein.

One form of such regulatory or resistance means, hereinafter referred to as resistance legs, is shown in detail in Figure 4. The various forms which such fixed resistance legs may take are not, per se, new, but rather are well known in the art. They may be constructed with inherent resistance, of predictable value to water flow, and by properly selecting the value of resistance legs, such as 26 and 36 of Figure 1, the rate of flow through the pipes containing them may be selected and maintained at substantially constant ratio, as is desired. Each such resistance leg, designated in general by the terminal numeral 6, comprises, in the form illustrated in Figure 4, an entrance-end fitting 63, which is secured in position by conventional coupling means such as 65, and which leads smoothly to a rounded throat 61 of reduced size, and thence opening abruptly to an enlarged chamber 64, whence water flows through the exit-end fitting 66. The size of the throat is so calculated, with relation to the area of chamber 64, and to the water pressure and flow rate, that only the desired amount of water is permitted to pass through the restricted throat 61, in a given period of time, and the resistance to flow is a function of the enlargement in passing from 61 to 64. If a resistance leg is provided with a larger throat, that is, with a lesser difference between 61 and 64, obviously the resistance which is inherently built into the second unit is less, and the rate of flow through the second unit is higher than that through the first unit. This rate remains constant for any pressure and normal rate of flow through the system, hence the ratio of flow through the two legs remains constant. The same results may be obtained, of course, by valves variably opened, or one opened to a greater extent than the other, but in order to avoid the temptation to effect adjustment while in use, to avoid the necessity of effecting initial relative adjustments, and to provide a unit which is designed and assembled correctly for the particular installation concerned, it is preferred to used fixed resistance legs as described.

Comparison of Figure 5 and Figure 1 illustrates the many check valves and variable piping circuits eliminated by use of the assembly within casing 300 of Figure 1, although the system of Figure 5 incorporates facilities for additional types of heating control, which in some instances may be desirable, but which could not be achieved in the simple system of Figure 1. The resistance to water flow, offered by each such pipe or accessory eliminated, is variable and cannot be computed with certainty in advance, and their elimination makes more secure the use of fixed resistance legs as discussed above. In short, those elements which affect system water circulation rates, and which are not within casing 300 in the arrangement shown in Figure 1, are normally fully specified, and relatively invariable (or relatively insignificant), and hence may be accurately accounted. It is the object, then, of a unitary assembly of piping, pump, heating means, and resistance legs, or any part thereof, as illustrated in Figure 1, or Figure 2, or Figure 3, or Figure 5, to provide means selected and calibrated in advance of installation, which will produce specified rates of water circulation in the particular application for which they are selected.

Figure 9 is a schematic wiring diagram for two conventional, reversible, proportioning-valve motors 524 and 534, which appear in Figure 5, and the operation of which is controlled by a single remote rheostat button 500. Two wipers 1012, 1013 are permanently affixed to button 500, one of which wipers 1012 positions motor 524 by its position on the resistance coil 501, while the other wiper 1013 positions motor 534 by its position on the resistance coil 502. It can be seen that any rotation of button 500 will rotate motor 524 in one direction and at the same time rotate motor 534 proportionately in the opposite direction. Let us consider Figure 5. In that figure, when mixing valve 5001 is controlled by space air temperature, such inversely proportional operation of motors 524 and 534 will result in varying the volume of heated water supplied the rapid heater through pipe 521, and inversely varying the temperature and volume of water supplied the uniform heater through pipe 532. Coils 501 and 502 may be so chosen and arranged, by conventional means, that the total heat supplied through pipes 521 and 532 does not substantially change, in order that a change in position of button 500 will affect only the ratio of the heat supplied by the rapid heater as regards that supplied by the uniform heater, and will not affect total heat supply. Such "button" control of the type of coordination between, and operation of, two heating means used in combination is one of the objects of the arrangement shown in Figure 5. Such control of coordination may be required to best suit comfort of the space occupants during different seasons, or to suit a change of occupants of the space, in that the relation between space air temperature and space radiant temperature (peculiar to the particular space and heating means concerned) will be altered by a change of position of button 500. Both air heater and uniform heater capacities will be chosen sufficiently large to permit of variation within the desired limits without sacrifice of total "design" capacity.

The resistance of, and position of, coil 501 of Figure 9, considered in relation to coil 502, may be so chosen as to proportion the rotation of, and limit the rotation of, motors 524 and 534 in any specified way. This choice makes it possible to eliminate, from Figure 5, additional metering resistances which would otherwise be required in pipes 523 and 557, the function of which (maintenance of fixed flow ratios) can only be performed, in an operation involving modulating valve operation, by some similarly modulating resistance means.

Figure 10, applying to control of Figure 5 operation, shows a schematic wiring diagram for effectively combining the control operations illustrated in Figures 8 and 9, and for varying the ratio of air heat to radiant heat automatically and continuously, as required to maintain not only a uniform space air temperature, but also to maintain a uniform space radiant temperature. Differently stated, the purpose of such an arrangement is to compensate for the chilling effect present in a room when the surface temperature of structure, or fixtures, in the room is disproportionately lower than the room air temperature. Such effects occur, for instance, when outdoor temperature is unusually low, and the temperatures of walls and glass surfaces are proportionately lower than usual, even though room air temperature is at a usually comfortable level. Or, alternately, the object may be to correct the difference in comfort existing between spaces sparsely occupied, and the same spaces when crowded, although at the same space air temperature in each case. As a further example, such an arrangement may be used to compensate for the gradually disappearing chilling effect, characteristic of long underheated or infrequently used spaces, such as churches or auditoriums, which chilling effect is due to the radiant cooling effect of structural surfaces not wholly warmed until some time after space air temperature has been at the (otherwise) satisfactory level. In terms of the air heating capacity, and the radiant or uniform heating capacity, of the combined heating means, the object of the control means shown in Figure 10, is to vary, by automatic means, the ratio between the two heating capacities, to the end that substantially unchanging air temperature and substantially unchanging radiant temperature are simultaneously maintained in the space heated. However, in the case of Figure 1, for example, since air temperature is regulated at a predetermined value, radiant temperature necessarily varies to meet changes in the total temperature requirements of the space. On a warm day, where the total requirements are low because of the high outdoor temperature, both radiant heating and air heating are low, the infiltrated heat of outdoors supplying the large portion of the internal heat requirements. On a cold day, however, in order to achieve the same effective temperature of the space, both the radiant heating means and the air heating means will be caused to produce larger quantities of heat. Consequently, on a warm day the system of Figure 1 will produce a lower radiant temperature than it will on a cold day, because of its preselected proportioning between the air and radiant heating effects. On the other hand, in the case of the system of Figure 5, controlled as by means of the apparatus of Figure 10, the proportioning or ratio between the two heating effects is varied in accordance with the dictates of radiant temperature sensing control means, which acts to preserve constancy of radiant temperature. Hence, in this case, on a warm day, perhaps all, or nearly all, of the total heat produced artificially in the space is produced by radiant heat, the heat of outdoors supplying the necessary balance by its effect on internal air temperature, whereas on a cold day the ratio of radiant heat to air heat, artificially produced, is small.

Referring again to Figure 5, motor 510 positions mixing valve 5001, to control the temperature of water supplied the combined means through pipe 574. Motor 534 positions valve 5013 and thereby varies the volume and temperature of water circulated to the uniform heater. Motor 524 positions valve 5012, and thereby varies the volume of water circulated to the rapid heater.

Space air temperature control means, thermostat 5100 of Figure 10, consists of two potentiometer coils 605 and 606, and wipers 1050 and 1060 respectively, operated simultaneously by any change in room air temperature. Space radiant temperature control means, thermostat 5300, such as of the black body type, of Figure 10, also consists of two potentiometer coils 603 and 604, and wipers 1030 and 1040 respectively, operated simultaneously by any change in room radiant temperature. The construction and operation of radiant temperature sensitive thermostats suited to this purpose are well known.

Coil 604 of thermostat 5300 is so chosen and arranged, in a manner familiar to the art, as to control the position of motor 534 between the limits of rotation desired. Coil 603 is so chosen and arranged with respect to coil 604 and wiper 1030, that, with thermostat 5100 fully satisfied and requiring no heat, thermostat 5300 by means of coil 603, can still position valve 5001, by effect on motor 510, to supply water through pipe 574, 564, at any specified temperature suitable for use in the uniform heater. This temperature need not be high enough for effective use in the rapid heater, indeed, should be low enough to allow of effective change by any possible simultaneous demand on the part of coil 605 in thermostat 5100. Similarly, with thermostat 5300 fully satisfied, and coil 603 ineffective as regards positioning of motor 510 and valve 5001, coil 605 in thermostat 5100, so chosen and arranged, can still position valve 5001, through motor 510, to supply water at any specified temperature through pipe 574, 575 to the rapid heater. This temperature should be high enough for effective use in the rapid heater, yet low enough to allow of representative increase by a possible simultaneous demand on the part of coil 603 in thermostat 5300. Coil 606 in thermostat 5100 is chosen and arranged, with respect to coil 605, to effect the desired contemporary position of valve 524, between the desired limits of rotation of motor 5012.

When the equipment and arrangement, illustrated in Figure 5, is used to supply heat to a rapid heater, and to a radiant heater, both used in combination to heat a single space, or group of spaces, such heating operation being controlled as shown in Figure 10, the operation resulting is mechanically capable of greater variation, as regards the obtainable ratios of rapid heater capacity to uniform heater capacity, than is any arrangement utilizing a single pump and a single control valve. This is true because only that amount of water may be by-passed around the uniform heater, when a single pump is used, that is circulated through the rapid heater. In the Figure 5 arrangement, however, the entire amount of water handled by pump 543 may be recirculated through by-pass pipe 557, being so recirculated, if desired, by position of valve 5013. Or, as was previously pointed out, by arranging valve 5013 in pipe 531 (see Figure 13), a constant amount of water may be circulated through the uniform heater, but with no addition of heated water. Because of this greater flexibility, in the arrangement shown in Figure 5, this arrangement is used for example of the combined operation controlled as shown in Figure 10. It is believed, however, that a comparably modified arrangement of Figure 2 will, in practice, be found preferable.

Figure 2 shows in plan a conditioner unit 301, similar to unit 300 of Figure 1, in that it is a self contained or "package" type of unit, but differing from the form of Figure 1 by addition of a proportioning valve 2001, operated by reversible motor 2000, and by the addition of pipe 230, which is arranged to divert water from pipe 221 directly into pipe 223, thus by-passing the rapid heater coil 202, and preventing heat transfer between such by-passed water and the rapid heater. The piping plan of Figure 2 is the same as the modified plan of Figure 12, the latter being based on Figure 5. Proportioning valve 2001 is a conventional fixture familiar to a person skilled in the art, and is controlled as indicated by Figure 8. Pipes 221, 230, 232 and 231 of Figure 2 are the counterparts of 21, 39, 32 and 31 of Figure 1, and, for purposes of example, may be considered to be similarly connected with a uniform radiant heater and a mixing valve such as, but not necessarily identical with, heater coil 3 and valve 1 as shown in Figure 1.

Let us compare Figure 1 and Figure 2. Figure 1 illustrates the usage of a rapid heater and a uniform heater in an arrangement having a fixed coordination, or fixed ratio of rapid heat to uniform heat, while Figure 2 illustrates an arrangement wherein the ratio of rapid heat to uniform heat may be continuously varied, as best suits the end in view. Such variable coordination, or variation of the ratio of rapid heat to uniform heat, is required, for instance, where it is determined to heat to the fullest possible extent by radiant heating means alone, with provision for supplementary rapid heat should space temperature fall below a specified level, due, for instance, to the lag in response to increased requirements, on the part of such uniform heater. These conditions obtain where existing installations of radiant panel heating are entirely satisfactory excepting only as regards the rate of increasing the heat supply, and it is required to correct this deficiency by supplementary combined air heating means. Or, alternately, it may be required to vary the coordination between combined heating means for other purposes. For instance, if it is not possible to accurately determine the ratio between rapid and delayed heating requirements of a space, or if it is required for whatever reason, that some ratio of heater capacity, other than the ratio of rapid to delayed requirements, be utilized, it may be required to vary the coordination between the two heaters to prevent continuous overrunning of the desired temperature level. Or, again, it may be required to vary the coordination between the two heaters in a manner to best suit the maintenance of a measure of uniformity of space radiant temperature, as well as the simultaneous maintenance of a uniform space air temperature. In short, the coordination, between rapid heating means and uniform heating means arranged as illustrated by Figure 2, can be varied, by automatic control means, to meet a wide range of heating system requirements, all foreign to prior heating systems, and beyond realization by prior heating means. Operation of the combined means may be varied only as regards each other, with an unchanging total heating rate, which case is discussed in the first example below. Alternately, a second type of variation may be preferable, in which the total combined capacity will vary in amount proportional to the variation in the air heater, which case is discussed in the second example below.

As a first example of such operation, in which the desired space air temperature condition requires only that an adequate supply of heat, whether rapid or uniform, be at all times available to maintain a minimum space air temperature, the uniform heater is so chosen as to supply the total heat requirements of the space served. For the space exampled in the discussion of Figure 1, the uniform heater, used in conjunction with the arrangement shown in Figure 2, would have a "design" capacity of 63,000 B. t. u./hr., would be supplied through pipe 232 with, for example 15 g. p. m. of water at a temperature of 105° F. Allowing 20% for downward loss, this water would be returned from the uniform heater through pipe 231 at a temperature of 95° F. From a consideration of factors rapidly affecting space temperature and factors delaying response of the uniform heater, in a manner indicated above, it is decided to have rapid heater capacity of (for example) 27,000 B. t. u./hr. Since water in pipe 227 will, at times, not have been cooled by the rapid heater coil 202, having been by-passed around that coil, the rate of recirculation of water through pipe 235, 237 must be chosen sufficiently high to allow of a temperature in pipe 227 which is suitable for supplying rapid heat requirements to coil 202. In a manner familiar to the art it is determined to supply 2 g. p. m. of water to unit 301, through pipe 221, at a temperature of 170° F. If entirely diverted around coil 202, through pipe 230, this water will arrive at pipe 227 at 170° F. and be mixed in pipe 240 with 13 g. p. m. of water recirculated through pipe 235, 237 to produce 15 g. p. m. at 105° F. as required for the uniform heater. Air heater coil 202, then, is chosen to supply 27,000 B. t. u./hr. when supplied through pipe 222 with 2 g. p. m. of water at 170° F. However, any heat supplied by the rapid heater is removed from the 2 g. p. m. of heated water, which therefore arrives at pipe 227 at some temperature below 170° F., and the heat initiated into the uniform heater is thereby lessened in an amount proportional to the heat transferred to the rapid heater, and thereby is prevented a duplication of heat supply.

With the temperature of water entering unit 301 through pipe 221 varied by any conventional means, arranged as shown by Figure 8, and responding to, for instance, outdoor temperature, or to space radiant temperature, it will be clear that the total heat supplied unit 301 will be varied according to space heating requirements. If, then, valve 2001 is so positioned by motor 2000, under influence of some other conventional means, such as, for instance, a space air temperature controller, also arranged as shown by Figure 8, it will also be clear, that when space air temperature is satisfied, all heat will be diverted around the rapid heater coil 202, and will be supplied to the space only by the uniform heater. On the other hand, if space temperature drops below the desired level before manifestation of the required heat supply on the part of the uniform heater, the space air temperature controller will allow passage of some greater part of the water from pipe 221 through the rapid heater, whence it will be rapidly transferred to the space, and at the expense of the heat subsequently supplied by the uniform heater. Thus, the temperature of water, in pipe 221, may be controlled as though a single heater only were to be supplied with heat. However, the space air temperature, chosen to control the by-pass valve 2001, is not freely chosen, but is rather a function of the characteristics of the space heated, the uniform heating means, and the temperature (whether outdoor temperature or space radiant temperature), chosen to control temperature of water in pipe 221. It is recognized that some low limit must be observed as to the temperature of air delivered into a space. Therefore, a limit of rotation of motor 2000, chosen to maintain a minimum discharge air temperature of, for instance, 65° to 70°, will usually be found necessary.

A second, preferable, type of variation of coordination, as between rapid and uniform heating rates, permits fully effective use of an outdoor control means, in that a supplementary space air temperature controller is so chosen and arranged as to not only control the position of valve 2001, but also to exert a supplementary influence on the temperature of water, and therefore on the amount of heat supplied to unit 301 through pipe 221. Such supplemental control of total heat supply will correct for errors characteristic of an outdoor control means used alone, and arising from lack of response to all factors, affecting space temperature, which arise within the space itself. Such control means and arrangements are entirely familiar to the art. Alternately a space radiant temperature controller may replace such outdoor control means if desired, to the end that space radiant temperature be, to a certain extent, maintained uniform, while the supplemental space air temperature controller, in effect, maintains a uniform space air temperature.

As an example, of variation of coordination between rapid and uniform heaters, in which the total combined capacity will vary, as well as the ratio of rapid heat to uniform heat, let us consider the same space defined for Figure 1. Further, the heating requirements of the space are to be supplied by a uniform heater "design" capacity of 36,000 B. t. u./hr. and a rapid heater "design" capacity of 27,000 B. t. u./hr., also as for Figure 1. The conditioner unit 301 of Figure 2, as discussed above, is, then, satisfactory for use without change in control arrangement, or in embodied equipment except as to modify the rate and temperature of water circulations. In a manner as outlined above, it is now determined that 7½ g. p. m. be recirculated through pipe 235, 237 at 95° F., and 1½ g. p. m. be admixed from pipe 227 at 155° F., to supply 9 g. p. m. to the radiant heater at 105° F. The outdoor temperature thermostat, or space radiant temperature controller, then, is so arranged as to supply to unit 301 a maximum temperature of water, through pipe 221, of 155° F. As it is desired that this temperature be inadequate for the required maximum rapid heater capacity, there is provided a supplemental space air temperature controller, so arranged, in a conventional manner, as to not only control the flow of water through by-pass pipe 230, as compared with that through air heater coil 202, but to simultaneously effect an increase in the temperature of water entering unit 301, until at maximum or "design" requirements, water entering unit 301 through pipe 221 is at a temperature of, for instance, 165° F., instead of, as above, 155° F. The air heater coil is then so selected as to have a capacity of 27,000 B. t. u./hr. with a flow of 1½ g. p. m. of water at 165° F. It can be seen, that, as the temperature increase (effected by the supplemental space air temperature controller) of water entering unit 301, through pipe 221, is itself increased (for instance, to 175° F. instead of to 165° F.), the additional increments of heat supplied by the rapid heater has proportionately less effect on the heat being simultaneously supplied to the uniform heater through pipe 227. Similarly as this effect (of the supplemental space air temperature controller on the temperature of water entering unit 301) decreases, rapid heat is produced more and more at the expense of heat simultaneously being supplied to the uniform heater. By choice of the extent of this effect, it is possible to choose that coordination between the rapid and uniform heaters which best meets the requirements of the space served. The limits of rotation of motor 2000 must again be arranged to maintain a suitable air discharge temperature.

Figure 3 illustrates the usage of two radiator or convector heating means in combination. Water is supplied through pipe 71, at a temperature suitably controlled by any conventional control means, to one or more radiators 72 and 73, located in the space to be heated, and arranged to serve as a rapid heater. Water leaving radiators 72 and 73 passes through a "delaying" tank 78 which may be, but is not necessarily, included. A resistance leg 76 is provided to control the rate of circulation of water through radiators 72, 73 and admixed, in pipe 41, with water returned from radiators 84, 85, and 86 representing a uniform heater of larger capacity than the rapid heaters 72, 73, and also located in the space to be heated. Circulation is governed by pump 44, driven by motor 42. Water returned from radiators 84, 85, and 86, is in part returned to the source (not shown) for reheating through pipe 89, and is, in remaining part, recirculated through "delaying" tank 88, as determined by resistance leg 86. Water so recirculated is admixed in pipe 41 with water from pipe 74, as above noted, for circulation to the radiators 84, 85 and 86.

The object, of the arrangement illustrated in Figure 3, is to provide combined heating means whereby, in a space or spaces heated, those spaces with the most chilling exposures are supplied with heat by radiators, or other like means, at the highest temperatures, while spaces also served by the same combined heating means, but having less extreme exposures, may be simultaneously supplied with heat by radiators, or other suitable means at milder temperatures, and, thereby to compensate more equitably for the differing requirements of differently exposed spaces, than is possible through use of a single heating means alone.

For example, if it is determined by methods described elsewhere herein, to circulate 1 g. p. m. of water at a temperature of 200° F. through pipe 71 to radiators 72, 73, the required heating effect of such radiators being such as to remove 10,000 B. t. u./hr. from the water, the temperature of water in pipe 74 will be 180° F. If the required heating effect of radiators 84, 85 and 86 is 15,000 B. t. u./hr., and 3 g. p. m. are circulated to them from pipe 43, the temperature of water entering these radiators will have to be 160° F., and the temperature of the water leaving them will be 150° F. Pipe 89 will return, then, 1 g. p. m. at a temperature of 150° F. to the source for reheating, and 2 g. p. m. will be recirculated through tank 88 and pipe 83, at a temperature of 150° F., for admixture of 1 g. p. m. of water at 180° F. from pipe 74, to produce the 3 g. p. m. at 160° F. required for radiators 84, 85, and 86. Under such conditions, it is obvious that radiators 72, 73 operate with an average maximum water temperature of 190° F., and that they respond, relative to radiators 84, 85, 86, rapidly to any change of temperature of water supplied through pipe 71. Similarly, radiators 84, 85, and 86 will operate with an average maximum water temperature of 155° F., and respond more slowly to such change in temperature in pipe 71 due to the effect of water recirculated through pipe 83, and tanks 78, 88. Radiators 72, 73 and radiators 84, 85, and 86, when proportionately disposed, by design, throughout a space or spaces according to the extremity of exposure, and the location of such extreme exposure, will obviously more correctly compensate for such inequalities in exposure than could a single heating means. Further, since spaces with extreme exposures are the first to respond to changed outdoor conditions, the incidence of change in rate of heat supply by the respective rapid or uniform radiators will more closely correspond to the required incidence, in that a change in the heating rate of the uniform radiators is delayed beyond that of the rapid heaters, and delayed therefore, in that portion in which heat is supplied to a particular space by uniform radiators. Should it be desired, this delay in response on the part of the uniform radiators may be artificially lengthened, to better suit requirements, by a "delaying" tank 78, or 88, or both 78 and 88. In the example above, a tank 78 having a capacity of 20 gallons will delay the uniform heaters an additional 20 minutes beyond their inherent time lag behind a change in the rapid heater. Similarly, a tank 88 having a capacity of 40 gallons, will further delay the full influence of such a change on the uniform radiators by 20 minutes per each recirculation required for reestablishment of balanced operation (as between the rapid and uniform radiators), of which recirculations more than one is required as discussed elsewhere herein.

The operation described above for Figure 3 is not, of course, limited to the combination of two radiator systems, since any one, or two, conventional heating means may be combined for similar results, with due allowance in arrangement, or control means, or both, for the peculiarities of the means employed.

If, in Figure 3, air heating coils be substituted for the radiators 72, 73, and for radiators 84, 85, 86, another advantage of such a combined heating means appears. As air circulation is, in a conventional air heating system, proportioned, as between spaces being heated, according to the heating requirements of each space, and not according to the volume of that space (which normally determines the air circulation requirements of the space), it can be seen that the spaces having the lowest ratio of contained volume to heating requirements have the highest rate of air circulation. For optimum operation, the opposite condition is usually preferable for occupancy comfort, as is known to a person skilled in the art. Two air heaters, so chosen that one delivers air at a relatively high temperature, the other so chosen as to deliver air at a lower temperature, and arranged similarly to the two radiator means of Figure 3, can be used in combination to correct air circulation rates as between rooms of differing ratios of contained volume to heating requirements. Heated air from each air heater is carried to each space heated, and proportioned to each space, according to its ratio of volume to heating requirements, so that the spaces with the highest such ratio are supplied the greatest proportion of air at the lower temperature (from the uniform heater), and spaces with the lowest such ratio are supplied the greatest proportion of air at the highest temperature (from the rapid heater), to the end that not only air temperature, but also air circulation is maintained within the limits desired.

It is deemed superfluous to discuss in more detail, the operation, control, and objects of variations of the arrangement shown in Figure 3, in the light of the preceding discussions. However, one variation of combined heating operation, resulting solely from arrangement of a single heating means and system accessories, may be considered in connection with Figure 3.

Such a variation may be required for use when the heating means chosen for heating a space is too rapid in response, or when the control means normally cause too rapid a correction in rate of heat supply to the space. For instance, outdoor thermostats may cause too rapid compensation in rate of heat supply, particularly to massive structures. Or, alternately, it may be required from whatever cause, to supply only a relatively small proportion of rapid heat, and even that proportion in a relatively delayed fashion. In such cases it may be that, for instance, radiators 84, 85, and 86 of Figure 3 adequately meet both rapid and delayed requirements, and therefore, radiators 72, 73 are eliminated altogether, and hot water is led directly to resistance leg 76 by pipe 71. By selection of rate of recirculation through pipe 83, and size of delaying tank 86, it may be found that a single heating means, such as, but not limited to, radiators 84, 85, 86 may best meet the requirement of a particular space, supplying both rapid and delayed heat, without supplementary heating means.

When two or more spaces are supplied with heat from a single central source, it is frequently required that the heat supply to each space be individually controllable. Such provision may be required, for instance, for the maintenance of different temperatures, as between different apartments in an apartment building. Alternately, such provision may be required for the maintenance of a common temperature within different spaces, each having differently varying heat requirements. Such, for example, would be the case in a school building, in the separate schoolrooms of which it may be required to maintain a temperature of 73° F., although the number of occupants of any one schoolroom, and consequently its heating requirements, are, compared with other schoolrooms heated, continuously varying. Or, again, such provision may be required to adequately compensate for differing sources of heat within each space, or for differing exposures to weather, and to the sun, as between different spaces supplied with heat from a single source.

Figure 11 illustrates a method of providing for such individual control of space heat supply, while retaining the advantages of combined heating means. Although any heating means may be combined, as best suit the particular requirements, Figure 11 illustrates a sectional view of two spaces 9000, 9001 supplied with heat by a common uniform heating means, consisting of pipe coils 903 imbedded in the structure surrounding spaces 9000, 9001. Space 9000 is also supplied with rapid heat by an air heater 922. Thermostat 900, located in space 9000, admits heated water to air heater 922, through pipe 905, by means of motor-operated valve 901, as required for maintenance of the temperature desired in space 9000. Similarly, space 9001 is supplied with rapid heat by air heater 902, to which heated water is supplied through pipe 906, as required by thermostat 910, controlling motor-operated valve 911. Water circulation is motivated by pump 904 driven by motor 941, which operates continuously throughout the heating season in the example illustrated. Water leaving air heater 902 through pipe 907, together with water leaving air heater 922 through pipe 908, is circulated through pipe 909, 927 to pipe 940, wherein it is admixed with cool water returned, through pipes 931, 935, 937, from the uniform heater. Pump 904 then circulates the mixed water to uniform heater coils 903 through pipe 932. Water returned from the uniform heater through pipe 931 is in part diverted through pipe 935 for recirculation to the uniform heater, and in remaining part, returned to the source of whatever nature, through pipe 939, for reheating, and circulation to rapid heaters 902, 922, through pipes 921, 905, 906. It is assumed, for purposes of example, that a central fan, not shown, circulates air through duct 953 as required for all spaces heated, and that air heaters 902, 922 contain only air heating coils of any suitable nature. Air diverted from duct 953 by duct 950 passes over air heater 922, and is discharged into space 9000 through duct 952 and register 954. Air passing through duct 951 passes over air heater 902, and is discharged into space 9001 through duct 963 and register 964. Air is vented from spaces 9000, 9001 through grilles 955, 965, and is exhausted to the out-of-doors through duct 956, or returned, through duct 956, to the central fan for recirculation, as best suits the requirements of the installation.

A specific example of system design is omitted, being deemed unduly repetitious, and because in the light of previous discussion, such design will at once be apparent to one skilled in the art.

As illustrated in Figure 11, heated water will be admitted to the uniform heater, from pipe 927, only in the total amounts supplied the air heaters 902, 922. When no additional heat is required by either space 9000 or 9001, no heated water whatsoever is available to the uniform heater through pipe 927, and water supplied the uniform heater through pipe 932 is water wholly recirculated from pipes 931, 935, 937, no circulation occurring in pipes 939, 921, 905, 906, 927. Under such conditions no heat is supplied either to space 9000 or to space 9001. When, for example space 9000 requires additional heat, however, thermostat 900 will open motor-operated valve 901 to allow passage of heated water to air heater 905, and thus supply heat at once to space 9000 only, although initiating an increase in the eventual uniform heat supply to space 9001, as well as to space 9000. Thus both spaces are supplied with uniform heat at a rate proportional to the combined rates of individual rapid heat supply. Meanwhile, space temperature in each space, within limitations of the heating means chosen, will be individually controllable by variation of the individual air heat supply.

Thermostats 900 and 910, and motor operated valves 901 and 911, may be of the conventional "on-off" type, or they may be conventional potentiometer type controls as illustrated in Figure 8. The temperature of water supplied through pipe 821 may be invariable, and fixed by conventional control means at the source, or alternately, may be varied in temperature by a conventional motor-operated mixing valve controlled by outdoor control means, all in a manner entirely familiar to one skilled in the art. Similarly, the temperature of air in duct 953 may be maintained at a specified minimum, or be varied by conventional means responding to some factor influencing space temperature.

The arrangement illustrated in Figure 11 retains the advantages of combined heating means for each space heated, and further, does so with minimum duplication of equipment, and in a manner conducive to the use of fixed, calibrated accessories, which may be selected prior to installation to produce a specified operation, all to the ends enumerated in the discussion of Figure 1.

Specific control means discussed throughout this specification have been limited to conventional control means of the modulating type. However, within the limitations peculiar to itself, any other conventional type of control means may be used to control any of the operations discussed herein.

I claim as my invention:

1. The system for heating a plurality of rooms in a single building, comprising single delayed heating means communicating with all of said rooms to supply a portion of the heating requirements thereof, individual rapid heating means for said rooms, connected in parallel to constitute a group, heating fluid circulating means operable to circulate heating fluid from a prime source of heat through the group and thence to the delayed heating means, individual valve means operable to regulate the flow of fluid through the respective rapid heating means, and room temperature thermostats located in the rooms and coacting with the corresponding valve means to regulate the flow of heating fluid to the rapid heating means individually in response to variations in room temperature, the heating effect of the delayed heating means thereby being coordinated with and corresponding to the average effect of, the rapid heating means in all the rooms.

2. In a space heating system, in combination with a prime source of heating fluid, a rapid heat exchanger, a uniform heat exchanger, both operatively arranged to heat said space, fluid circulation means connecting the rapid heat exchanger to receive fluid from the prime source, and the uniform heat exchanger to receive fluid discharged, at a lower temperature, from the rapid heat exchanger, and to return fluid to said prime source, recirculating circuit means interconnecting the uniform heat exchanger outlet and inlet, and by-passing the rapid heat exchanger and the prime source, further recirculating circuit means interconnecting the uniform heat exchanger outlet and the rapid heat exchanger inlet, and by-passing the prime source, to supply a mixture of recirculated fluid and prime source fluid to said rapid heat exchanger, means in the circulation system adjustable to vary the ratio of heated fluid to recirculated fluid supplied to said rapid heat exchanger, and hence the temperatures of fluid supplied to the rapid and uniform heat exchangers, and means responsive to space temperature changes, and operatively connected to said ratio-varying means, thereby to effect a substantially immediate change in rapid heat exchanger output and to initiate simultaneously a proportional change in uniform heat exchanger output which, because of its lag, materializes later.

3. The heating system defined in claim 2 and pump means operatively disposed in the fluid circuit between the uniform heater and one end of the recirculating circuit means therefor, operable to establish fluid circulation in the entire circuit.

4. In a space heating system, in combination with a prime source of heating fluid, a rapid heat exchanger, a uniform heat exchanger, both operatively arranged to heat the space, fluid circuit means connecting the rapid heat exchanger to receive fluid from the prime source, and the uniform heat exchanger to receive fluid from the prime source, and both heat exchangers to return fluid therefrom to said prime source, recirculating circuit means interconnecting the uniform heat exchanger outlet and inlet, and by-passing the rapid heat exchanger and the prime source, pump means operatively disposed in the fluid circuit between the uniform heat exchanger and one end of the recirculating circuit means to establish by-pass flow through said recirculating circuit means and uniform heat exchanger and thereby lower the latter's temperature, and heat output control means cooperating with both heaters and operable to vary the total rate of delivery of heat carried by the fluid in said fluid circuit to said rapid and uniform heat exchangers, to effect a substantially immediate change in rapid heat exchanger output, and to initiate simultaneously therewith a proportional change in uniform heat exchanger output which, because of the lag therein, materializes only with passage of time.

5. The space heating system defined in claim 4, and further comprising means operatively disposed in the fluid circuit to vary adjustably the rate of flow of heating fluid from the prime source to one of the heat exchangers relative to that to the other heat exchanger.

6. The space heating system defined in claim 5, wherein the flow adjusting means comprises a by-pass interconnecting the inlet and outlet of the rapid heat exchanger and valve means adjustable to vary the proportion of heating fluid flowing through the by-pass relative to that through the rapid heat exchanger.

7. The space heating system defined in claim 6, wherein the fluid circuit connects the uniform heat exchanger to receive heating fluid discharged from the rapid heat exchanger.

8. In a space heating system, in combination with a prime source of heating fluid, a rapid heat exchanger, a uniform heat exchanger, both operatively arranged to heat the space, fluid circuit means connecting the rapid heat exchanger to receiver fluid from the prime source, and the uniform heat exchanger to receive fluid discharged at reduced temperature from the rapid heat exchanger, and to return fluid discharged from the uniform heat exchanger to said prime source, recirculating circuit means interconnecting the uniform heat exchanger outlet and inlet, and by-passing the rapid heat exchanger and the prime source, pump means operatively disposed in the fluid circuit between the uniform heat exchanger and one end of the recirculating circuit means to establish by-pass flow through said recirculating circuit means and uniform heat exchanger and thereby lower the latter's temperature, and heat output control means cooperating with both heaters and operable to vary the total rate of delivery of heat carried by the fluid in said fluid circuit to said rapid and uniform heat exchangers, to effect a substantially immediate change in rapid heat exchanger output, and to initiate simultaneously therewith a proportional change in uniform heat exchanger output which, because of the lag therein, materializes only with passage of time.

9. In a space heating system, in combination with a prime source of heating fluid, a first heat exchanger, a second heat exchanger, both arranged to heat the same space, circuit means connecting said heat exchangers to receive fluid from said prime source, and to return fluid to said prime source, a by-pass connected between inlet and outlet of the second heat exchanger for recirculation therethrough of fluid discharged therefrom to lower its temperature substantially below that of the first heat exchanger, and a pump operatively disposed in the circuit between the second heat exchanger and one end of said by-pass to circulate fluid through both exchangers, the prime source and said by-pass.

10. The heating system defined in claim 9 and automatic control means operable to control the total rate of delivery of heat from the prime source to both exchangers automatically in accordance with space temperature variations.

GEORGE A. MUSSEN.

REFERENCES CITED

The following references are of record in the file of this patent:

UNITED STATES PATENTS

| Number | Name | Date |
|---|---|---|
| 2,023,447 | Shurtleff | Dec. 10, 1935 |
| 2,211,573 | McGrath | Aug. 13, 1940 |
| 2,282,013 | Wetzsteon | May 5, 1942 |
| 2,307,723 | Anderson | Jan. 5, 1943 |
| 2,382,340 | Smith | Aug. 14, 1945 |

FOREIGN PATENTS

| Number | Country | Date |
|---|---|---|
| 212,604 | Switzerland | Mar. 17, 1941 |